June 7, 1955  R. F. E. STEGEMAN  2,710,331
HEATING APPARATUS FOR THERMOPLASTIC ARTICLES
Filed May 8, 1952  2 Sheets-Sheet 1
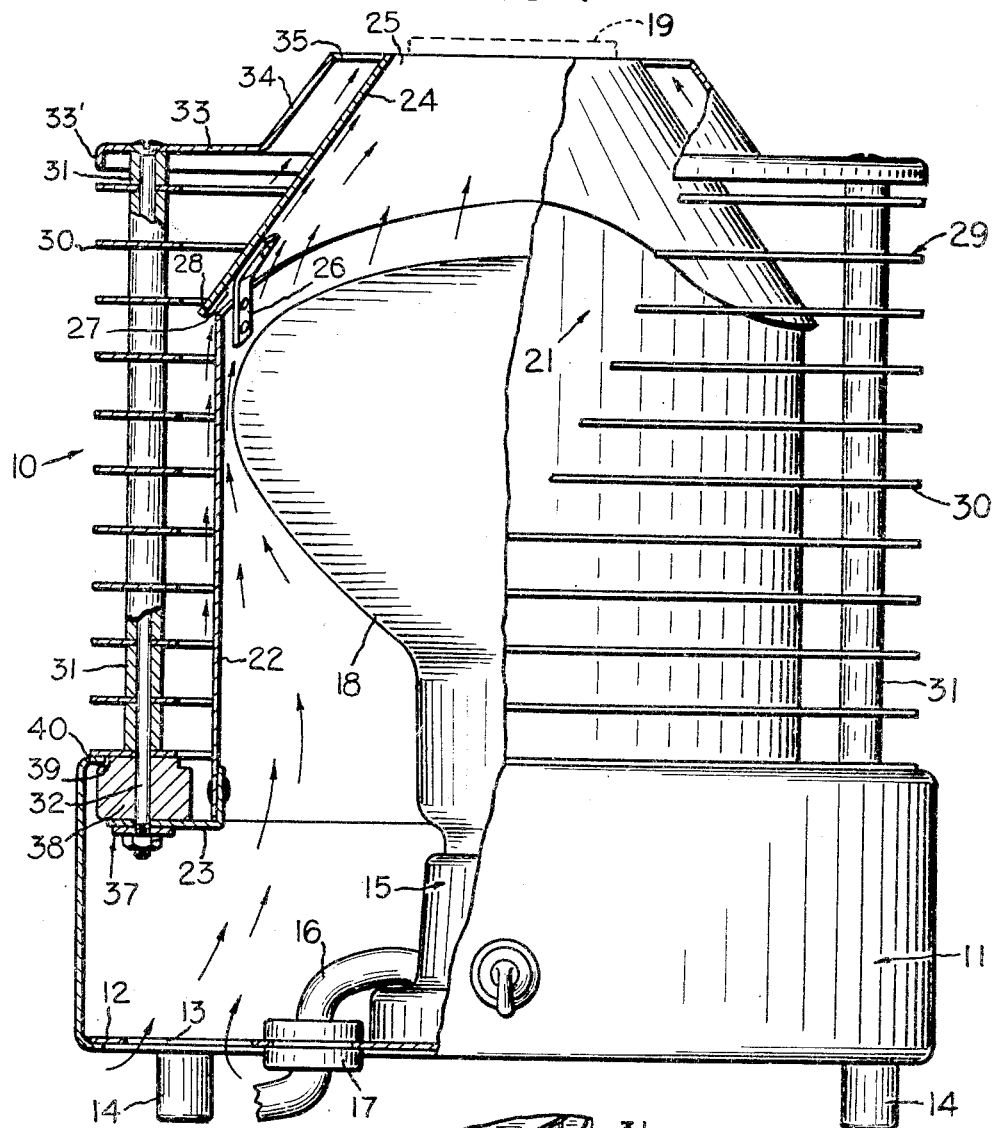
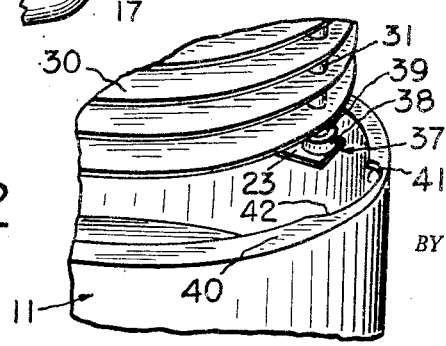
INVENTOR.
R.F.E. STEGEMAN
BY
ATTORNEY June 7, 1955 R. F. E. STEGEMAN 2,710,331
HEATING APPARATUS FOR THERMOPLASTIC ARTICLES
Filed May 8, 1952 2 Sheets-Sheet 2
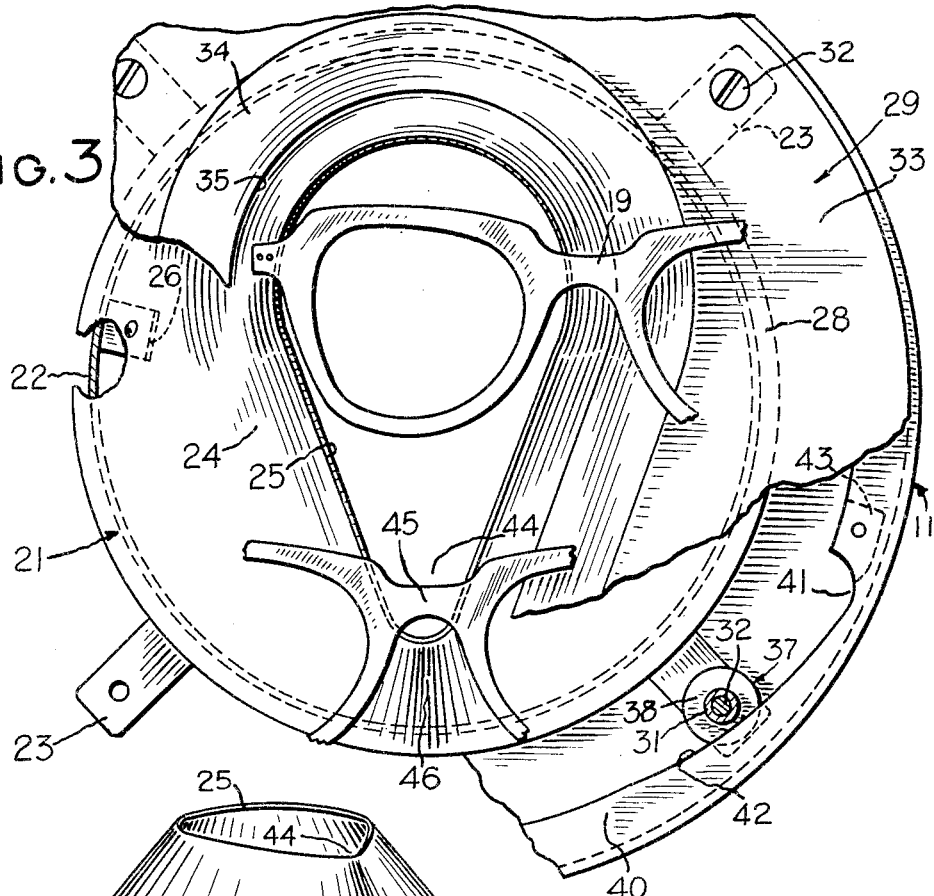
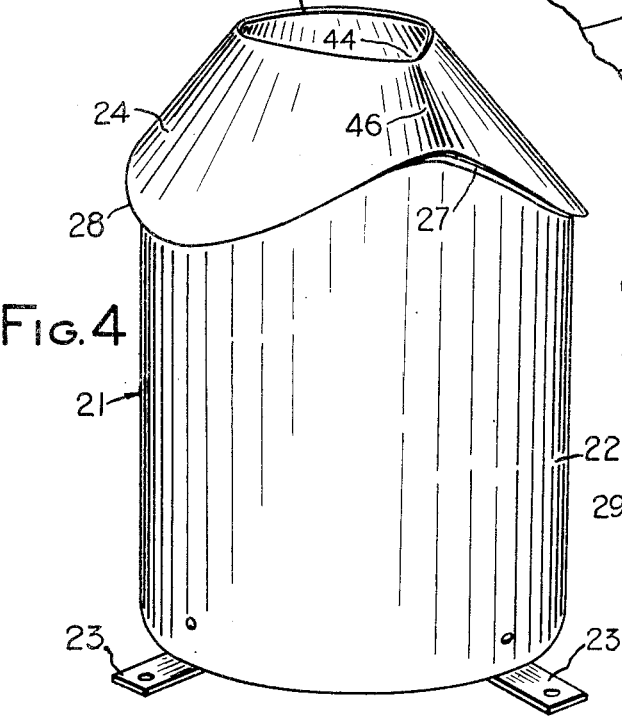
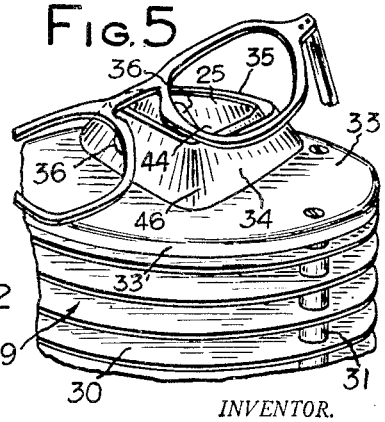
INVENTOR.
R. F. E. STEGEMAN
BY
ATTORNEY United States Patent Office 2,710,331
Patented June 7, 1955

2,710,331

HEATING APPARATUS FOR THERMOPLASTIC ARTICLES

Raymond F. E. Stegeman, Greece, N. Y., assignor to Bausch & Lomb Optical Company, Rochester, N. Y., a corporation of New York Application May 8, 1952, Serial No. 286,851

4 Claims. (Cl. 219—45)

This invention relates to heating apparatus and more particularly relates to an improved heating apparatus for articles which are made of thermoplastic or heat softening material such as ophthalmic frames and the like.

When it is necessary to adjust the non-metallic portions of spectacle frames and the like by reshaping, it is often necessary and desirable to selectively heat small areas as well as large areas of the frame with a steady and intense heat while utilizing a safe and effective source of heat such as the modern infrared lamp. Because of the large diameter of such lamps, various movable heat shields have been used over the lamps in the past to restrict the heating area to a desirable size but such an apparatus is wasteful of the heat and not safe to use since the exposed parts are hot.

It is an object of this invention to provide a novel heating apparatus for the non-metallic parts of spectacle frames and the like which is safe and effective to use, easy to operate and service and easily portable.

It is a further object to provide such a device having heat conducting and guiding means around the heat source so constructed as to protect the user against accidental burns and to use a maximum of the heat that is emitted from the source.

A further object is to provide such a device wherein said heat conducting and guiding means is so shaped and arranged that small areas such as the nasal portions as well as large areas of spectacle frames may be selectively heated without resorting to movable, loose or temporary heat shielding.

These and other objects and advantages will be apparent in the details of construction and the arrangement and combination of parts by reference to the description given herebelow and the accompanying drawing in which, Fig. 1 is a side view, with parts in section, showing a preferred form of my invention, Fig. 2 is a fragmentary perspective view of a detail of the structure of Fig. 1, Fig. 3 is a top view of the structure shown in Fig. 1 with some parts broken away, Fig. 4 is a perspective view at a reduced scale of a part of the structure of Fig. 1, and Fig. 5 is a fragmentary perspective view at a reduced scale of the top portion of the structure shown in Fig. 1.

With reference to the drawings, my heating apparatus, generally indicated at 10, has a base 11 of shallow cylindrical shape provided with a bottom plate 12 which is suitably fixed thereto and is pierced by a plurality of ventilating holes 13. Several feet 14 are attached to the base 11 to hold it above the surface on which it rests. On plate 12 a lamp socket 15 is secured by any suitable means, not shown, and an electrical connection 16 is connected from the socket through a grommet 17 in said plate to an electrical power line. In the socket 15, a heat lamp 18, such as those used for paint drying operations etc., is held in upright position whereby the emitted heat may be applied to a plastic ophthalmic frame 19 as best shown in Fig. 3.

The lamp 18 is housed in an open bottomed heat chamber 21 formed by a cylindrical side wall 22 which lies in close proximity to the largest part of the lamp and is held there by integral outwardly extending anchor clips 23 which are secured to the base 11 by a demountable connection hereinafter described. Surmounting the side wall 22 is a sloping canopy or roof 24 which is tapered upwardly toward an aperture 25 to concentrate the useful heat into a small area.

One of the features of my invention is the arrangement for directing the outer layer of hot air which surrounds the exterior of the chamber 21 into the interior of the canopy 24 so as to increase the useful heat at the aperture 25 and also prevent it from being dissipated outwardly since this results in overheating the parts that are contacted by the operator. This is accomplished by supporting the canopy spaced above the wall 22 by means of the brackets 26 so as to provide a peripheral opening 27 through which the exterior layer of hot air is directed up under the canopy 24 by an overhanging peripheral extension 28 on the lower part of said canopy. Two features are involved in this desirable flow of hot air mentioned above, one feature being the inward deflecting action of the overhanging extension 28 and the other feature being the inductive action of the rapidly rising hot air along the inner surface of the chamber 21, the last-named action tending to draw the exterior air through the opening 27. This increased flow of hot air is further augmented by the hot air which rises along the exterior surface of the canopy 24. The cooperative effect of these directional actions is to produce an intensified flow of heat to the aperture 25.

To protect the operator from contacting the hot parts of the heating apparatus, there is provided a safety guard 29 which, by reason of its self rigid construction and connection to the heat chamber 21, also serves as a means for facilitating the demounting of the chamber from the base 11. For this purpose, the safety guard is secured to the chamber 21 so that together they constitute a subassembly. On the aforementioned anchor clips 23 are assembled a multiplicity of annular plates 30 which surround chamber 21 in spaced relation thereto. Spacers 31 are provided between the plates 30 and all the plates and spacers are suitably pierced so that they may be clamped together to form the protective grille or guard 29 by several bolts 32 which are suitably secured to clips 23.

Of special importance is the top plate 33 of the grille which is specially formed as a strong structural part having a peripheral stiffening flange 33' by which this subassembly may be grasped and manipulated during disassembly from the base 11 and which also serves as a support for the hands of the operator when holding the work over aperture 25.

An inclined flange 34 is formed in the midportion of the plate 33 for the purpose of directing heated air inwardly to aperture 25 along the exterior surface of canopy 24. The flange has approximately the same inclination as the roof 24 of the chamber 21 and it terminates at the top in a horizontal opening 35 which corresponds in shape with, but is larger than, the aperture 25. As best shown in Figs. 1 and 5, flange 34 is spaced from the roof 24 to isolate the plate 33 from the hot parts of the chamber 21 and to provide a discharge passage for hot air adjacent to the aperture 25. The inclined flange portion 34 has a special usefulness as shown in Fig. 5 since it permits the operator to place the rather inaccessible parts of the spectacle frame, such as the nosepads 36, close to the aperture 25. Said flange 34 also acts as a stiffener for the plate 33.

For the purpose of locking the heat chamber subassembly onto the base 11, a locking connection generally indicated at 37 in Figs. 1, 2 and 3 is provided. This connection comprises several lock buttons 38 mounted on the clips 23 and each button is formed with a narrow peripheral locking recess 39 in which an inwardly projecting rim 40 on the base 11 is adapted to engage. The rim 40 is cut away to form a recess 41 for admitting the lock button 38 into locking position underneath said rim, said recess having a tapered part 42 serving as the abutment surface for engagement with the locking recess 39 in button 38. An abutment block 43 is fixed by any suitable means to the rim 40 at the end of the recess 41 to stop the unlocking movement at the unlocked position of the safety guard 29.

The aperture 25 in the canopy 24 is provided with a narrowed portion 44 having tapering sides in this form of my invention, as shown in Figs. 3 and 4. As illustrated in Fig. 3, this shape of aperture conveniently facilitates the heating of either an entire side of the spectacle frame 19 or merely a small part thereof such as the bridge 45 without using any auxiliary heat masking devices. This triangular shape of the aperture 25 is produced by forming at one side a raised ridge 46 radially in the sheet metal canopy 24 and so forming the edge of the aperture that it lies in a horizontal plane. Preferably, the edge of the aperture 25 is located substantially in the same plane as the upper edge of the inclined flange 34. Various modifications of the disclosed shape of the aperture 25 and the opening 35 may be provided, as desired, by shaping the ridge 46 or ridges in different ways whereby the heat may be directed, distributed and concentrated upon selected areas of the spectacles to be reshaped, even though the parts thereof be of different design and contour, the principal requisite being that any alternative shapes of the aperture 25 shall include a narrow heating area 44 in conjunction with a larger heating area. For maximum performance, all the parts of the heat chamber 21 should be brightly polished so that the heat energy is properly radiated and reflected.

From the foregoing it will be apparent that I am able to attain the objects of my invention and provide an improved heating device which is adapted for softening thermoplastic materials in order to adjust or reshape them. My device may be used to advantage by opticians for selectively heating portions of thermoplastic spectacle frames in order to soften the parts so that they may be shaped and adjusted to fit the wearer of the frame. Such adjustments are usually made at the fitting table so that it is essential to have available a device which will quickly provide an intense and concentrated source of heat. My device provides an instant and concentrated heat source which is safely housed so that the operator is protected against accidental burns. The top plate 33 of my device barely gets warm even after a long period of operation so that the operator may rest his hands thereon while holding the work over the heated areas.

It will be understood that the specific form and arrangement of the parts of my heating apparatus may be changed and substitutions may be made therein without departing from the spirit of my invention as defined in the claims appended below.

I claim:

1. A heating apparatus for softening articles made of thermoplastic material which comprises a base, a heating element mounted on the base, a vertical wall surrounding the element and carried by the base, a heat directing canopy mounted in spaced relation above said wall to provide an opening between the upper edge of the wall and the canopy, said canopy tapering upwardly toward an aperture at the top thereof, the lower peripheral edge of said canopy overhanging the upper portion of said wall to direct the heat flowing along the outer surface of the wall into said aperture, a safety guard fixed in encircling and spaced relation to said wall and including a rigid top plate extending over said canopy and provided with a heat opening over said aperture, and a separable interlocking connection cooperatively formed on the base and guard to demountably hold them together whereby the guard serves to protect the operator and provide a comfortable means of obtaining access to the heat from said element while the wall is hot.

2. A heating apparatus for softening articles made of thermoplastic material which comprises a base, a heating element mounted on the base, a cylindrical upright wall extending around said element and carried by said base, a pyramidal heat canopy mounted in spaced relation above said wall to provide an opening between the upper end of the wall and the canopy, said canopy tapering upwardly to an aperture, the tapering part of the canopy being provided with a ridge which extends into said aperture to form a narrow portion on one side thereof in which small sections of said articles may be heated, the lower peripheral edge of said canopy overhanging the upper edge of said wall whereby heated air rising along the outer surface of the wall is deflected under the canopy and out through the aperture to augment the direct heat rising from said element.

3. A heating apparatus for softening spectacles made of thermoplastic material which comprises a base, a heat lamp mounted on the base, a cylindrical upright wall surrounding and radially spaced from said lamp and carried by the base, a pyramidal heat canopy mounted in spaced relation above said wall to provide an opening between the upper edge of the wall and the canopy, said canopy tapering upwardly to an aperture, a safety guard encircling said wall in spaced relation thereto and carried by the base, said guard including a rigid top plate formed with a continuous upwardly inclined flange positioned approximately parallel to and spaced from said canopy, said flange terminating at the top in a second aperture which has the same shape as and is larger than the first aperture so as to form a heat flow passage therebetween which is directed toward the first aperture for conducting thereto the heat which rises past the said opening whereby the flange serves to elevate the second aperture above said plate to facilitate heating of the reentrant parts of spectacles as well as to stiffen said plate.

4. A heating apparatus for softening an article which comprises a base, a heating element mounted on the base, a vertical wall surrounding the element and carried by the base, a heat directing canopy mounted in spaced relation above said wall to provide an opening between the upper edge of the wall and the canopy, said canopy tapering upwardly toward an aperture at the top thereof, the lower peripheral edge of said canopy overhanging the upper edge of said wall to direct the heat from the outside of said wall into said aperture, and a rigid top plate supported by the base and spaced above said canopy, said top plate being provided with an opening in alignment with the aperture in the canopy whereby the top plate serves to protect the operator against the heat of the element while permitting access to the heat from the aperture.

References Cited in the file of this patent

UNITED STATES PATENTS

| | | |
|---|---|---|
| 500,765 | Heller | July 4, 1893 |
| 1,176,172 | Schleusselburg | Mar. 21, 1916 |
| 1,541,375 | Neuwirth et al. | June 9, 1925 |
| 1,596,141 | Baugh | Aug. 17, 1926 |
| 1,636,473 | Kelley | July 19, 1927 |
| 1,654,860 | Carmean | Jan. 3, 1928 |
| 1,711,472 | Lewin | Apr. 30, 1929 |
| 1,849,207 | Scheu | Mar. 15, 1932 |
| 2,335,098 | Anderson | Nov. 23, 1943 |
| 2,665,601 | Heath | Jan. 12, 1954 |

FOREIGN PATENTS

| | | |
|---|---|---|
| 30,292 | Netherlands | July 15, 1933 |